June 16, 1959 E. HAFNER 2,891,177

COAXIAL CRYSTAL MOUNT

Filed March 4, 1957

*INVENTOR.*
ERICH HAFNER

*BY* Harry M. Saragovitz
ATTORNEY

United States Patent Office 2,891,177

Patented June 16, 1959

2,891,177

COAXIAL CRYSTAL MOUNT

Erich Hafner, Long Branch, N.J., assignor to the United States of America as represented by the Secretary of the Army Application March 4, 1957, Serial No. 643,897

6 Claims. (Cl. 310—9.2)

(Granted under Title 35, U.S. Code (1952), sec. 266)

The invention described herein may be manufactured and used by or for the Government for governmental purposes, without the payment of any royalty thereon.

This invention relates to a piezoelectric mounting, and, more particularly, to a mounting for quartz crystal discs which are required to operate at very high frequencies.

In high frequency operation, crystals are conventionally mounted in clip or pressure mountings. These conventional mountings suffer from the inherent disadvantage due to the length of their lead wires and the losses in the bonding material which effect their operating characteristics. Relative to the use of clip mountings, it has been found that the very thin crystals required break easily when the crystal unit is to be assembled.

It is an object of this invention to provide a piezoelectric crystal mount which will not be open to these objections.

A further object of this invention is to provide a crystal unit which will achieve reliable frequency control in the frequency range above the 100 megacycle/second region.

Another object of the invention is to provide a piezoelectric mount having very low losses and a very low inductance in its support element.

Another object of the invention is to provide a piezoelectric mount of small dimensions and of very simple and inexpensive construction.

Another object of the invention is to provide a sealed or sealable crystal mount with facilities for permitting variation of the frequency of the crystal.

Another object of the invention is to reduce the hysteresis phenomenon resulting from mounting a piezoelectric crystal under pressure.

For a more detailed description of the invention, together with other and further objects thereof, reference is had to the following description taken in connection with the accompanying drawing, wherein.

Figure 1:
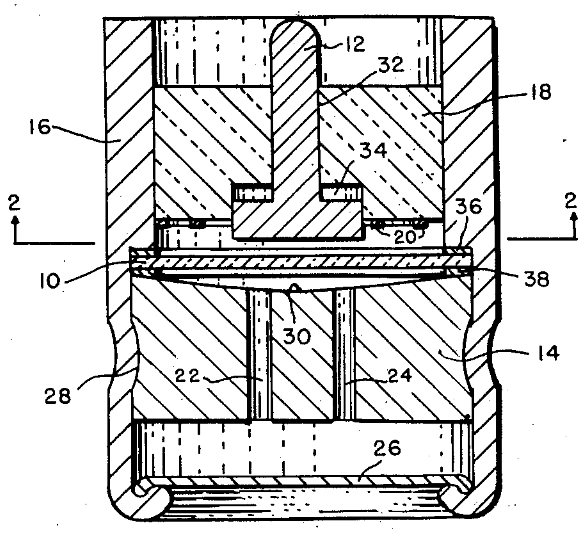
Fig. 1 is an enlarged sectional view of the invention.

In the drawing, 10 denotes a piezoelectric crystal element which may be in the form of a thin quartz crystal disc or plate which is mounted between an inner conductor 12 and a second electrode 14. The outermost peripheral edges of the electrode 14 and that of the piezoelectric crystal disc 10 are of similar circular form and are disposed on a circular abutment formed in the inner wall of a cylindrical, outer conductor 16, the upper portion of which is thicker than the lower. The rim of one face of the crystal 10 rests on said abutment in outer conductor 16, and the electrode 14 is pressed against the rim on the opposite face of crystal 10.

In order to eliminate or at leat reduce the hysteresis phenomenon frequently encountered in pressure mounted crystal units, the surfaces 36 and 38 in contact with the rim of the crystal disc 10 may be coated with a film of material which has a very low coefficient of friction with respect to quartz. Suitable material having this characteristic is rhodium.

Electrode 14 has a concave face 30 coextensive with and opposing a surface of crystal 10. Electrode 14 is provided with a circumferentially disposed groove 28 and into which can be accommodated a depressed portion of the outer conductor 16. This combination of the groove 28 and the depressed portion serve to position electrode 14 in a fixed position, and thereafter electrode 14 may be sealed in place.

Elements 12, 14 and 16 may be of a metal such as copper, so that the flat surface of inner conductor 12 facing crystal 10, and the curvature of the inner surface of electrode 14 can be economically produced by a cold forming technique, thus eliminating the need for any grinding and/or polishing of the electrodes.

Hermetically sealed to the inner wall of conductor 16 is an insulator 18 which may be made of ceramic, glass or other suitable material. Insulator 18 has a centrally disposed bore 32 terminating at one end in an enlarged opening 34. Hermetically sealed within the bore 32 is the conductor 12 which terminates in an enlarged portion and forms one electrode of the crystal unit.

The air-gap between the inner conductor 12 and the adjacent face of the crystal disc 10 may be critically controlled and adjusted by using a suitable jig before conductor 12 is sealed to insulator 18.

Figure 2:
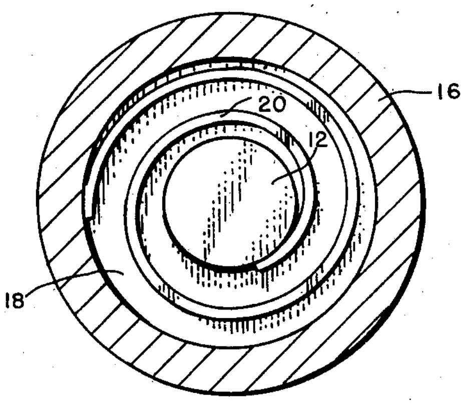
Fig. 2 is a cross-section taken along line 2—2 of Fig. 1.

On the surface of the insulator 18 facing the crystal 10, an inductance 20, formed as a spiral is deposited by printing, plating or painting a film of metal thereon. Spiral inductance 20 may be proportioned to antiresonate the static capacitance of the mount. One end of the spiral inductance 20 is connected to inner conductor 12 and the other end connected to the outer conductor 16, as shown more clearly in Figure 2.

For adjusting the resonant frequency of the crystal 10, thin films of conducting material such as gold or silver may conveniently be deposited by evaporation in vacuum thereon, through two apertures 22 and 24 provided in electrode 14. While only two such apertures are shown, it is to be understood that in the actual embodiment of the invention, any number of such apertures may be provided. Cover plate 26 is rigidly clamped by the inner walls of outer conductor 16 and effectively seals the mounting.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A coaxial piezoelectric mount comprising an inner conductor and an outer conductor, means for maintaining said inner conductor insulated from said outer conductor, a crystal mounted within said outer conductor and having opposed surfaces, one surface spaced from said inner conductor, a concave electrode mounted within and in contact with said outer conductor and having the periphery of its concave face in contact with the other surface of said crystal, said electrode having apertures therein through which a film of conducting material may be evaporated to reach a portion of the crystal and adjust the frequency thereof.

2. A coaxial piezoelectric mount comprising an inner conductor and an outer conductor, a crystal mounted within said outer conductor and having opposed surfaces, one of said surfaces being spaced from said inner conductor, means for maintaining said inner conductor insulated from said outer conductor, said means including an insulator secured within said outer conductor and having a spiral inductance mounted thereon which is positioned close to a surface of said crystal and operably associated therewith to neutralize the static capacitance of said crystal, said outer conductor being provided with a circular abutment on which the crystal is mounted, a concave electrode mounted within and in contact with said outer conductor and having the periphery of its concave face in contact with the other of said surfaces of said crystal, said electrode having apertures therein through which a film of conducting material may be evaporated on to a portion of the crystal and adjust the frequency thereof.

3. A piezoelectric crystal mount as set forth in claim 2, and further including a coating of material which has a very low coefficient of friction with respect to quartz deposited on those portions of said outer conductor and said concave electrode that are in abutment with said crystal.

4. A piezoelectric crystal mount as set forth in claim 3, wherein said material is rhodium.

5. A piezoelectric mount comprising a coaxial housing, a crystal, electrodes on opposing surfaces of said crystal, an insulator mounted within said housing and having a spiral inductance mounted thereon which is positioned close to one of said surfaces of said crystal and operably associated therewith to neutralize the static capacitance of said crystal, said housing being provided with a circular abutment on which the crystal is mounted, one of said electrodes being in contact with the periphery of the other of said surfaces of the crystal to maintain said crystal on the abutment, said electrode having apertures therein exposing a portion of said crystal to permit a film of conducting material to be evaporated thereon to adjust the frequency thereof.

6. A piezoelectric device comprising a crystal having electrodes on opposite surfaces thereof, one of said electrodes having apertures therein exposing a portion of said crystal to permit a film of conducting material to be evaporated thereon to adjust the frequency thereof.

References Cited in the file of this patent

UNITED STATES PATENTS

| | | |
|---|---|---|
| 2,409,607 | Bach | Oct. 22, 1946 |
| 2,453,435 | Havsted | Nov. 9, 1948 |
| 2,457,563 | Keller | Dec. 28, 1948 |
| 2,508,720 | Kuenstler | May 23, 1950 |
| 2,509,478 | Caroselli | May 30, 1950 |
| 2,598,722 | Richards | June 3, 1952 |
| 2,849,628 | Hollman | Aug. 28, 1958 |

OTHER REFERENCES

"VHF Crystal Grinding," Electronics, by Gerber, March 1954, pages 161 to 163.